United States Patent
Hiroki

(10) Patent No.: US 9,143,893 B2
(45) Date of Patent: Sep. 22, 2015

(54) COMMUNICATION APPARATUS AND CONTROL METHOD THEREFOR

(71) Applicant: CANON KABUSHIKI KAISHA, Tokyo (JP)

(72) Inventor: Shigeru Hiroki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 13/681,714

(22) Filed: Nov. 20, 2012

(65) Prior Publication Data

US 2013/0150077 A1 Jun. 13, 2013

(30) Foreign Application Priority Data

Dec. 9, 2011 (JP) .................................. 2011-270617

(51) Int. Cl.
| | | |
|---|---|---|
| H04W 24/00 | (2009.01) | |
| H04W 4/02 | (2009.01) | |
| G08B 21/24 | (2006.01) | |
| H04W 4/00 | (2009.01) | |
| H04W 84/12 | (2009.01) | |
| H04W 84/18 | (2009.01) | |
| H04W 16/18 | (2009.01) | |
| H04W 24/08 | (2009.01) | |
| H04W 52/02 | (2009.01) | |

(52) U.S. Cl.
CPC ................ H04W 4/02 (2013.01); G08B 21/24 (2013.01); H04W 4/025 (2013.01); H04W 4/008 (2013.01); H04W 16/18 (2013.01); H04W 24/08 (2013.01); H04W 52/0261 (2013.01); H04W 84/12 (2013.01); H04W 84/18 (2013.01)

(58) Field of Classification Search
CPC ......... H04W 4/02; H04W 64/00; H04W 4/20; H04W 4/14; H04W 4/22; H04W 76/007; H04W 12/12; H04W 4/028; H04W 52/0251; H04W 52/0261; H04W 64/006; H04W 24/00; H04W 4/12; H04W 4/18; H04W 84/042
USPC .............................. 455/456.1–456.3; 370/338
See application file for complete search history.

(56) References Cited

U.S. PATENT DOCUMENTS

2007/0075898 A1* 4/2007 Markhovsky et al. ........ 342/386
2007/0082676 A1* 4/2007 Bhogal et al. ............... 455/456.1

(Continued)

FOREIGN PATENT DOCUMENTS

| JP | 2005-107933 A | 4/2005 | ............. G08B 21/24 |
| JP | 2005-304002 A | 10/2005 | ............. G08B 13/22 |

(Continued)

OTHER PUBLICATIONS

Office Action dated Jun. 16, 2015 in JP Application No. 2011-270617.

*Primary Examiner* — Marcos Batista
(74) *Attorney, Agent, or Firm* — Fitzpatrick, Cella, Harper & Scinto

(57) ABSTRACT

Position information indicating the position of a communication apparatus or another communication apparatus when a predetermined message is received from the other communication apparatus, and battery information about the battery of the other communication apparatus are stored. The user is notified of the stored position information and battery information according to a user operation for the communication apparatus.

7 Claims, 14 Drawing Sheets

(56) References Cited

U.S. PATENT DOCUMENTS

| | | | |
|---|---|---|---|
| 2008/0070546 A1* | 3/2008 | Lee | 455/404.2 |
| 2008/0076431 A1* | 3/2008 | Fletcher et al. | 455/440 |
| 2011/0043857 A1 | 2/2011 | Hiroki | 358/1.15 |
| 2012/0115430 A1* | 5/2012 | Hawkes et al. | 455/404.1 |
| 2012/0270559 A1* | 10/2012 | Ingerson | 455/456.1 |

FOREIGN PATENT DOCUMENTS

| | | | | |
|---|---|---|---|---|
| JP | 2005-333626 A | 12/2005 | | G08B 21/24 |
| JP | 2006-171990 A | 6/2006 | | |
| JP | 2010-171911 A | 8/2010 | | |
| JP | 2011-002873 A | 1/2011 | | |

\* cited by examiner

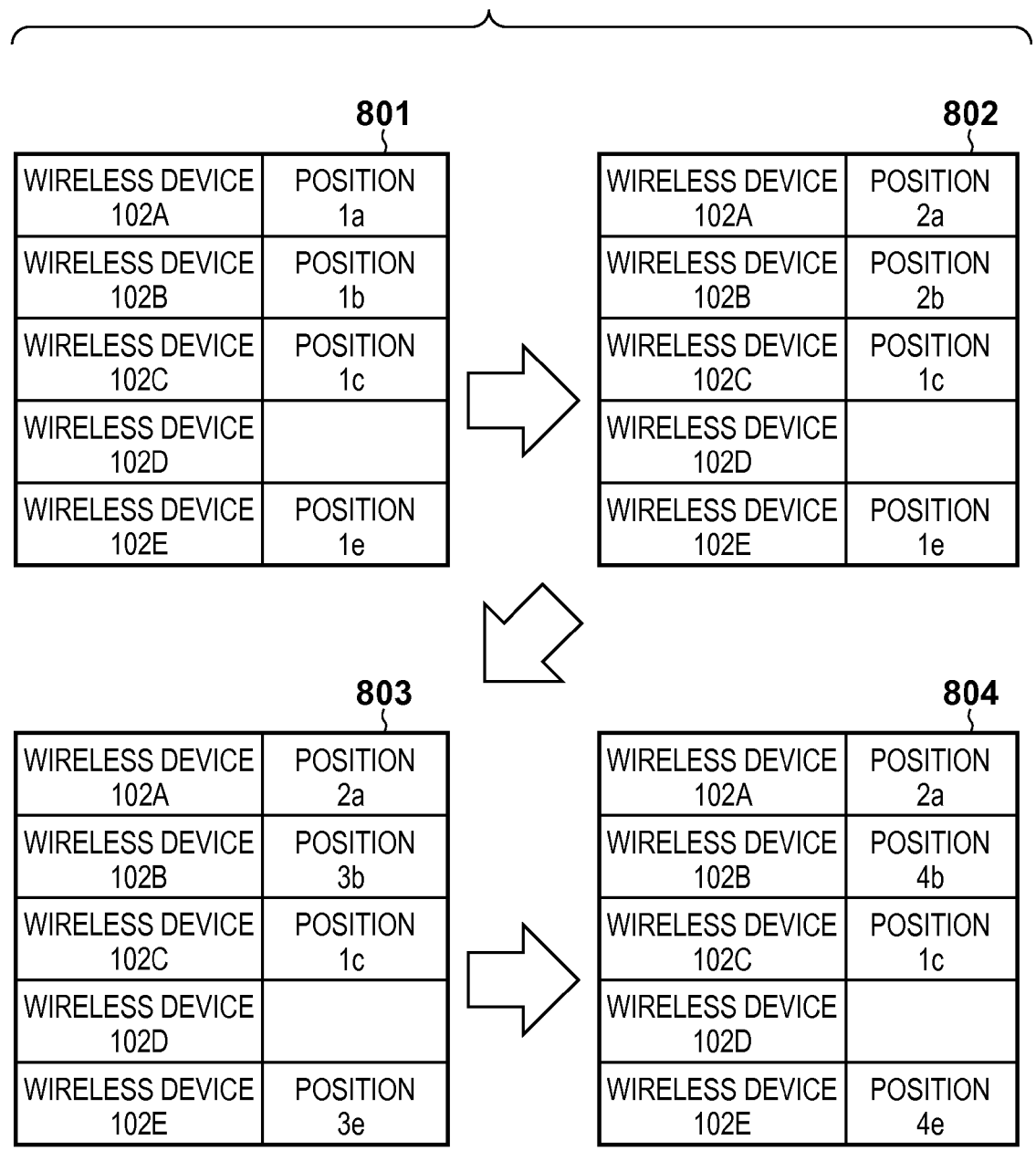
F I G. 8

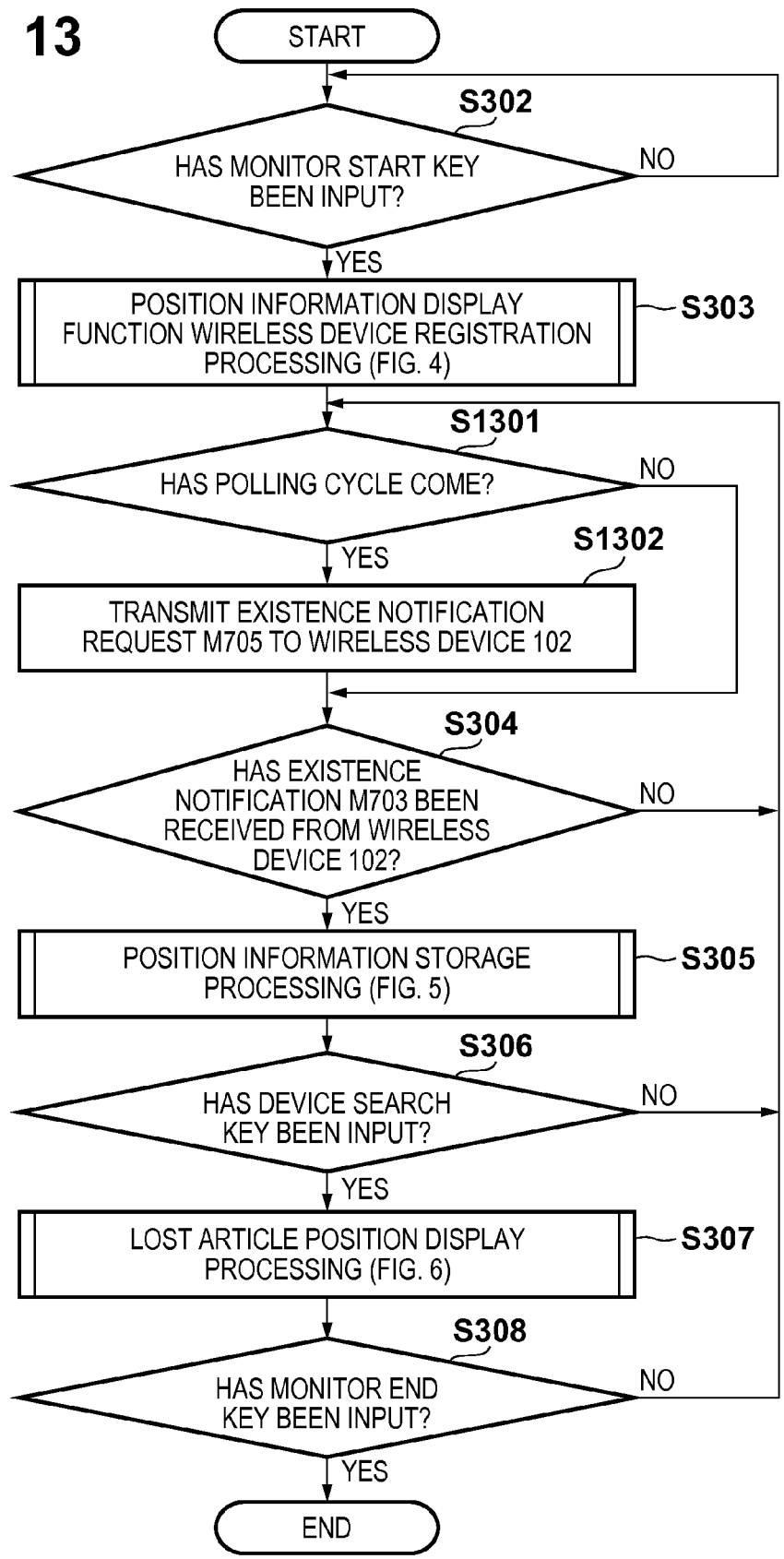

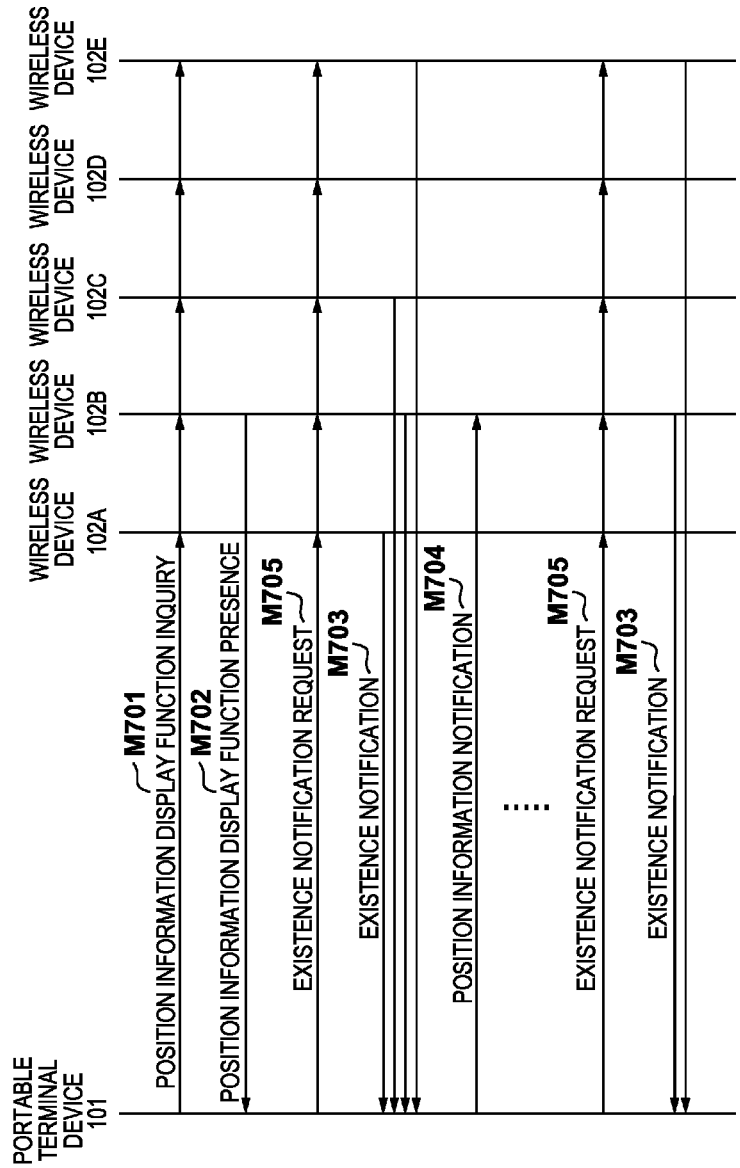

COMMUNICATION APPARATUS AND CONTROL METHOD THEREFOR

BACKGROUND OF THE INVENTION

1. Field of the Invention

The present invention relates to a communication apparatus having a wireless communication function.

2. Description of the Related Art

There has been conventionally provided a system which gives a warning when a wireless apparatus having a wireless communication function is lost or left.

Japanese Patent Laid-Open No. 2006-171990 discloses a technique in which a warning mode is set when the position information of a parent apparatus is compared with that of a child apparatus and they are not in the same area, and a warning is output if current position information is compared with the position information of the child apparatus when the warning mode is set and it is then determined that they are not in the same area.

Japanese Patent Laid-Open No. 2011-002873 discloses a technique in which it is detected that there is a lost article by transmitting a response signal if identification information contained in a received response request signal does not coincide with stored identification information.

Japanese Patent Laid-Open No. 2010-171911 discloses a technique in which if a child terminal does not receive a signal from a parent terminal, position information is acquired and transmitted to an information server to transit to an operation monitoring mode, and notification information is transmitted to the parent terminal upon detecting an operation set in advance in the child terminal.

If, however, a warning is issued when a radio wave is disconnected like the conventional examples, a warning is issued even when the user intentionally keeps the device away from himself/herself, or an error temporarily occurs in wireless communication. Furthermore, if the user does not notice a warning, he/she leaves the device behind.

SUMMARY OF THE INVENTION

The present invention has been made in consideration of the above problems, and provides a technique of notifying the user of a position where he/she lost an article.

According to one aspect of the present invention, there is provided a communication apparatus comprising: a reception unit which receives a predetermined message from another communication apparatus; a storage unit which stores position information indicating a position of the communication apparatus or the other communication apparatus when the reception unit receives the predetermined message, and battery information about a battery of the other communication apparatus; and a notification unit which notifies a user of the position information and the battery information stored in the storage unit according to a user operation for the communication apparatus.

According to another aspect of the present invention, there is provided a control method for a communication apparatus, comprising: a reception step of receiving a predetermined message from another communication apparatus; a storage step of storing, in a memory, position information indicating a position of the communication apparatus or the other communication apparatus when the predetermined message is received in the reception step, and battery information about a battery of the other communication apparatus; and a notification step of notifying a user of the position information and the battery information stored in the memory in the storage step according to a user operation for the communication apparatus.

According to still another aspect of the present invention, there is provided a computer-readable storage medium storing a computer program for causing a computer to execute a reception step of receiving a predetermined message from another communication apparatus, a storage step of storing, in a memory, position information indicating a position of the communication apparatus or the other communication apparatus when the predetermined message is received in the reception step, and battery information about a battery of the other communication apparatus, and a notification step of notifying a user of the position information and the battery information stored in the memory in the storage step according to a user operation for the communication apparatus.

According to the present invention, it is possible to notify the user of a position where he/she lost an article.

Further features of the present invention will become apparent from the following description of exemplary embodiments (with reference to the attached drawings).

BRIEF DESCRIPTION OF THE DRAWINGS

FIG. 8 is a view showing update examples of a position information storage table 211;

FIG. 13 is a flowchart illustrating processing executed by a portable terminal device 101; and FIG. 14 is a timing chart showing communication between the portable terminal device 101 and a wireless device 102.

DESCRIPTION OF THE EMBODIMENTS

Embodiments of the present invention will be described below with reference to the accompanying drawings. Note that each embodiment to be explained below shows an example when the present invention is practically implemented, and is a practical example of an arrangement defined in the appended claims.

First Embodiment

Figure 1:
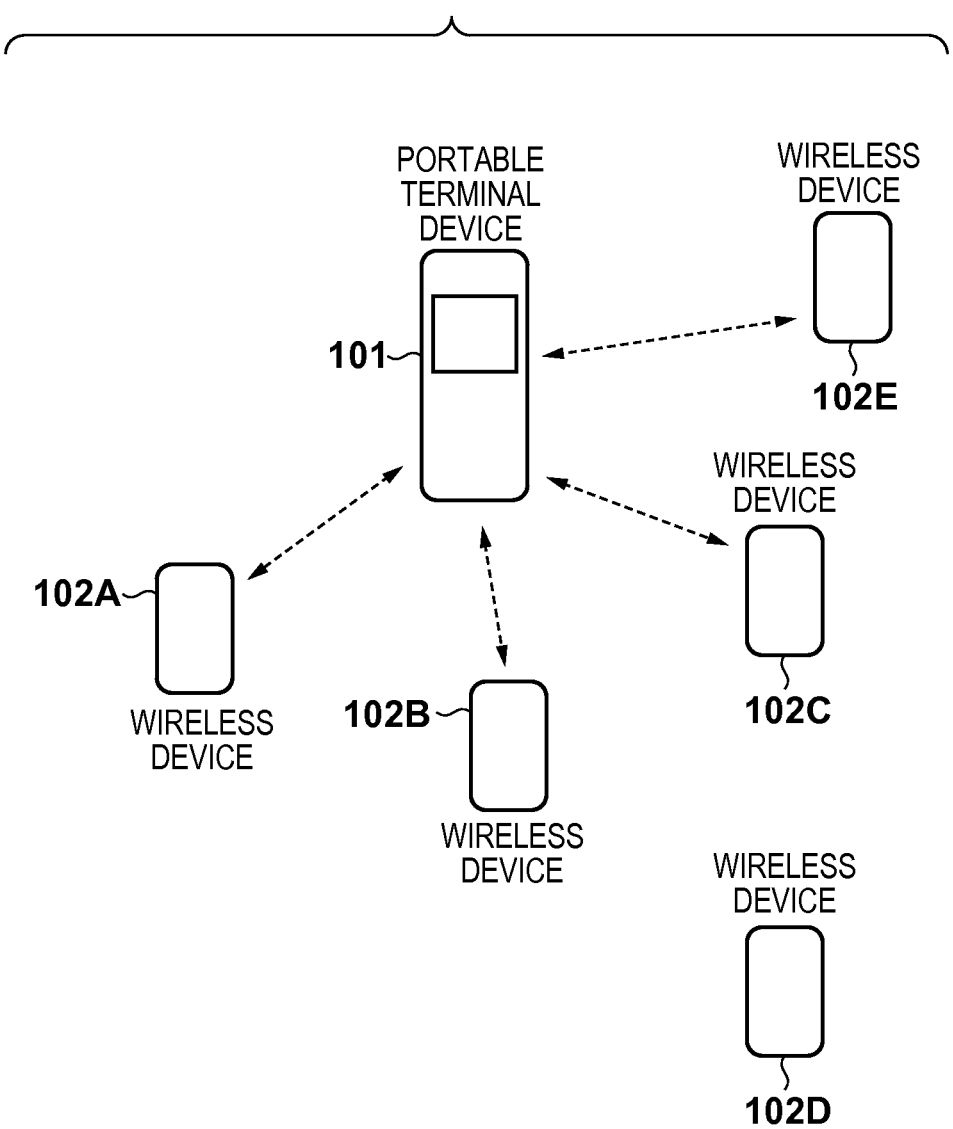
FIG. 1 is a view showing an example of the configuration of a system.

An example of the configuration of a system according to the first embodiment will be described with reference to FIG. 1. As shown in FIG. 1, the system according to the embodiment includes one communication apparatus (to be referred to as a portable terminal device hereinafter) 101, and five other communication apparatuses (to be referred to as wireless devices hereinafter) 102A to 102E. Note that although the number of wireless devices is five in FIG. 1, an arbitrary number of wireless devices may be included, as will be apparent from the following description. In the following description, the wireless devices 102A to 102E may be collectively called a wireless device 102.

Any device may be applied to the portable terminal device 101 as long as the device has a wireless communication function and a display function. Examples of the device applicable to the portable terminal device 101 are a portable telephone, smartphone, and notebook personal computer as well as a digital camera, video camera, game device, and the like incorporating a wireless function.

Any device may be applied to the wireless device 102 as long as the device can perform wireless communication with the portable terminal device 101. The portable telephone, smartphone, notebook personal computer, camera, video camera, game device, and the like exemplified above as a device applicable to the portable terminal device 101 are also applicable to the wireless device 102. Since the embodiment has as its object to identify a position where an article has been lost as follows, the type of wireless device 102 is not particularly limited. An accessory, a wristwatch, notes, and the like which generally have no wireless communication function can be used as the wireless device 102 by attaching a wireless tag which transmits a radio wave. In this case, the wireless tag may be considered as the wireless device 102.

Figure 2:
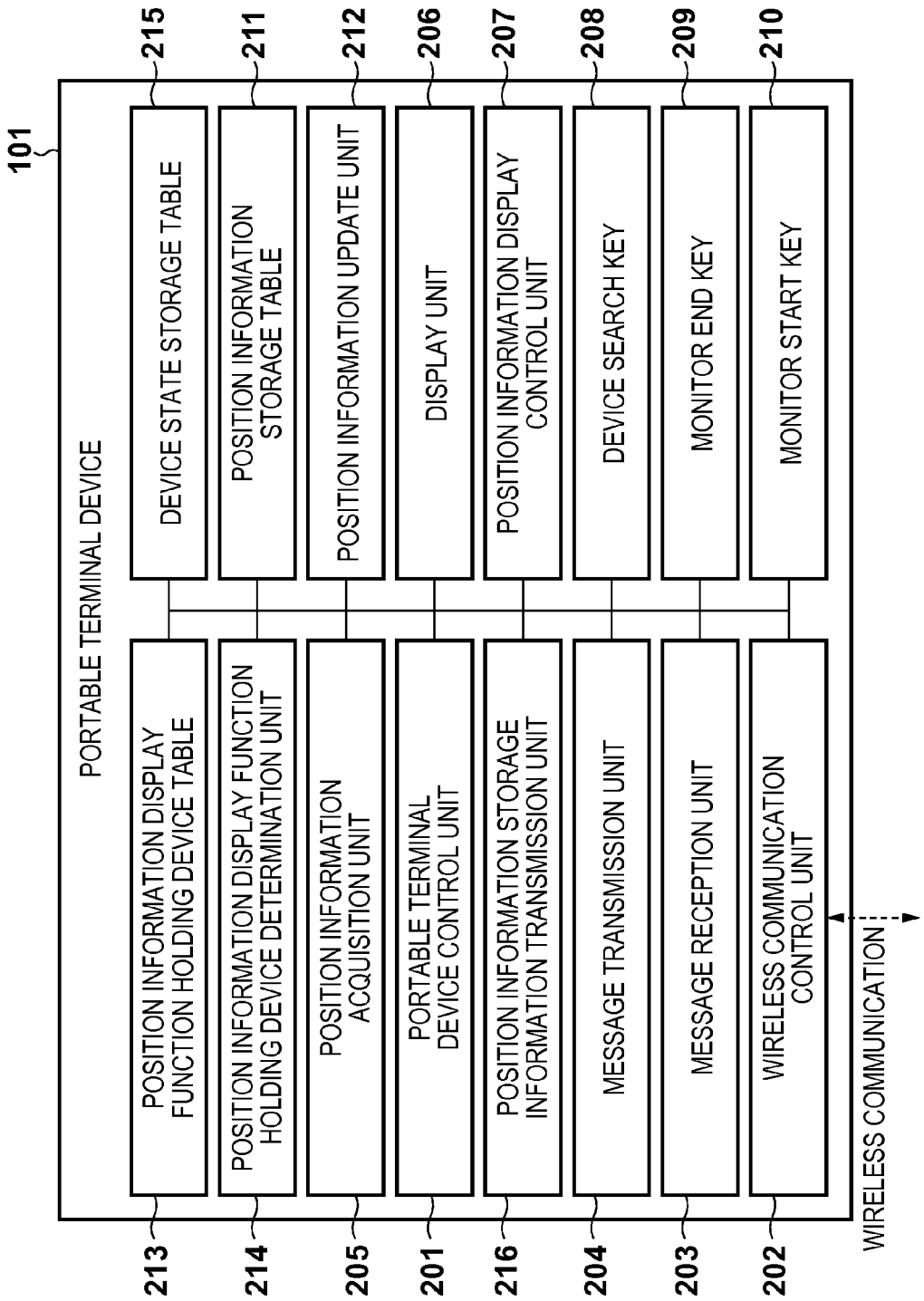
FIG. 2 is a block diagram showing an example of the functional arrangement of a portable terminal device 101.

An example of the functional arrangement of the portable terminal device 101 will be described with reference to a block diagram shown in FIG. 2.

A portable terminal device control unit 201 controls the operation of each unit forming the portable terminal device 101. A wireless communication control unit 202 performs wireless communication with the wireless device 102. Examples of wireless communication are a wireless LAN, Bluetooth, and the like. In particular, the Bluetooth Low Energy standard for low power consumption has been recently introduced, which is optimum for application of monitoring of a device to be described below. If the wireless device 102 is a wireless tag, RFID communication, NFC (Near Field Communication), or the like is used. The wireless communication function of the wireless device 102 may not include a reception function. If all the wireless devices 102A to 102E have no reception function, the wireless communication control unit 202 need not have a transmission function, and need only have a reception function. The wireless communication control unit 202 may have a function complying with not one but a plurality of wireless communication methods.

A message reception unit 203 is used to receive various messages transmitted from the wireless device 102. A message transmission unit 204 is used to transmit various messages to the wireless device 102.

A position information acquisition unit 205 acquires its position (the current position of the portable terminal device 101). The position information acquisition unit 205 includes a GPS (Global Positioning System) reception unit, and a position calculation unit for calculating the position of itself based on a signal received by the reception unit. The position information acquisition unit 205 may acquire its position from a wireless LAN access point or a base station in a portable telephone communication network.

A display unit 206 includes a display screen for displaying the control result of the portable terminal device control unit 201 with images and characters.

A device search key 208 is pressed by the user to cause the portable terminal device 101 to execute processing for checking, on the display unit 206, the position of an article (one of the wireless devices 102A to 102E in this example) which the user of the portable terminal device 101 lost. Note that the present invention is not limited to the device search key 208, and the user may operate any user interface to cause the portable terminal device 101 to execute the processing.

A monitor end key 209 is operated by the user to input, to the portable terminal device 101, an instruction to end monitoring of the position of the article (one of the wireless devices 102A to 102E in this example) which the user of the portable terminal device 101 lost. Note that the present invention is not limited to the monitor end key 209, and the user may operate any user interface to input the end instruction to the portable terminal device 101.

A monitor start key 210 is operated by the user to input, to the portable terminal device 101, an instruction to start monitoring of the position of the article (one of the wireless devices 102A to 102E in this example) which the user of the portable terminal device 101 lost. Note that the present invention is not limited to the monitor start key 210, and the user may operate any user interface to input the start instruction to the portable terminal device 101.

A position information storage table 211 holds information specific to each of the wireless devices 102A to 102E and a position which has been acquired by the position information acquisition unit 205 upon successfully receiving an existence notification message from the wireless device, in association with each other. The position information storage table 211 is implemented as one memory or table data in a memory.

A position information update unit 212 specifies, among the wireless devices 102A to 102E, the transmission source of the existence notification message which has been successfully received. The position information update unit 212 updates the position (or a default value) which has been registered in the position information storage table 211 in association with the information specific to the specified wireless device to the position which has been acquired by the position information acquisition unit 205 upon receiving the existence notification message.

A position information display function holding device table 213 holds information specific to a wireless device, among the wireless devices 102A to 102E, which can display position information. A position information display function holding device determination unit 214 inquires of each of the wireless devices 102A to 102E whether it has a function of displaying position information. The position information display function holding device determination unit 214 registers, in the position information display function holding device table 213, information specific to the wireless device which has responded, to the inquiry, that "it has the function".

A device state storage table 215 holds information specific to a wireless device, among the wireless devices 102A to 102E, which has responded to the existence notification message transmitted to each of the wireless devices 102A to 102E in response to press of the device search key 208.

A position information storage information transmission unit 216 transmits the information stored in the position information storage table 211 to the wireless device 102 which is indicated by the information stored in the position information display function holding device table 213.

Figure 3:
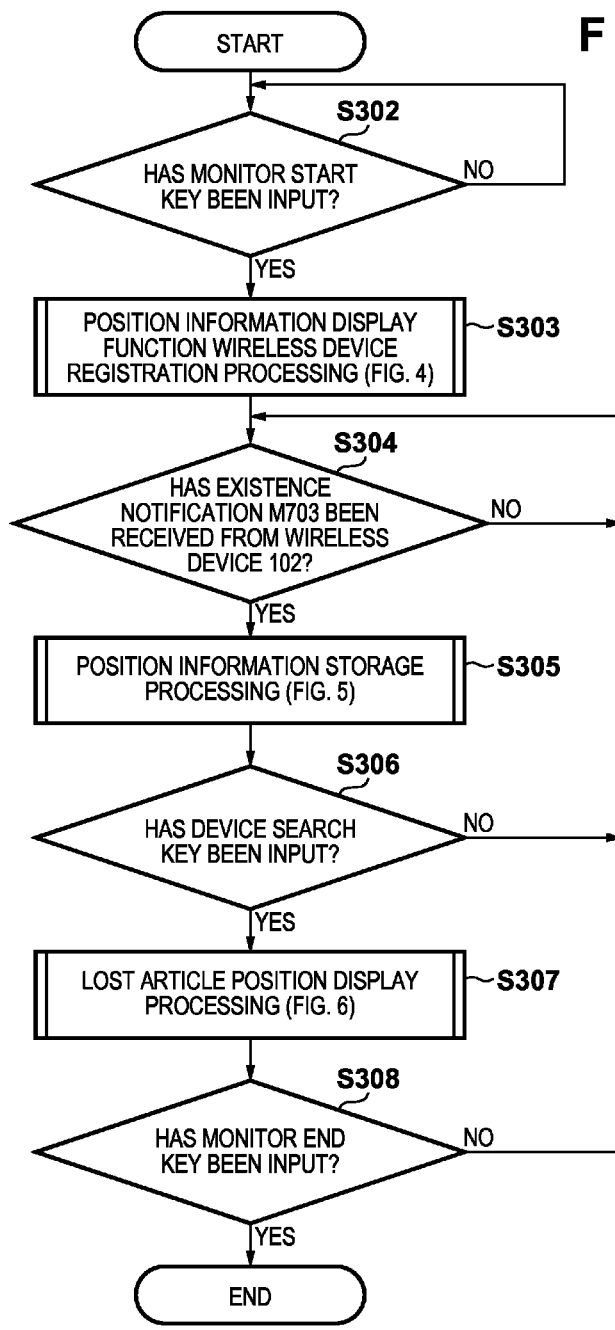
FIG. 3 is a flowchart illustrating processing executed by the portable terminal device 101.
Figure 7:
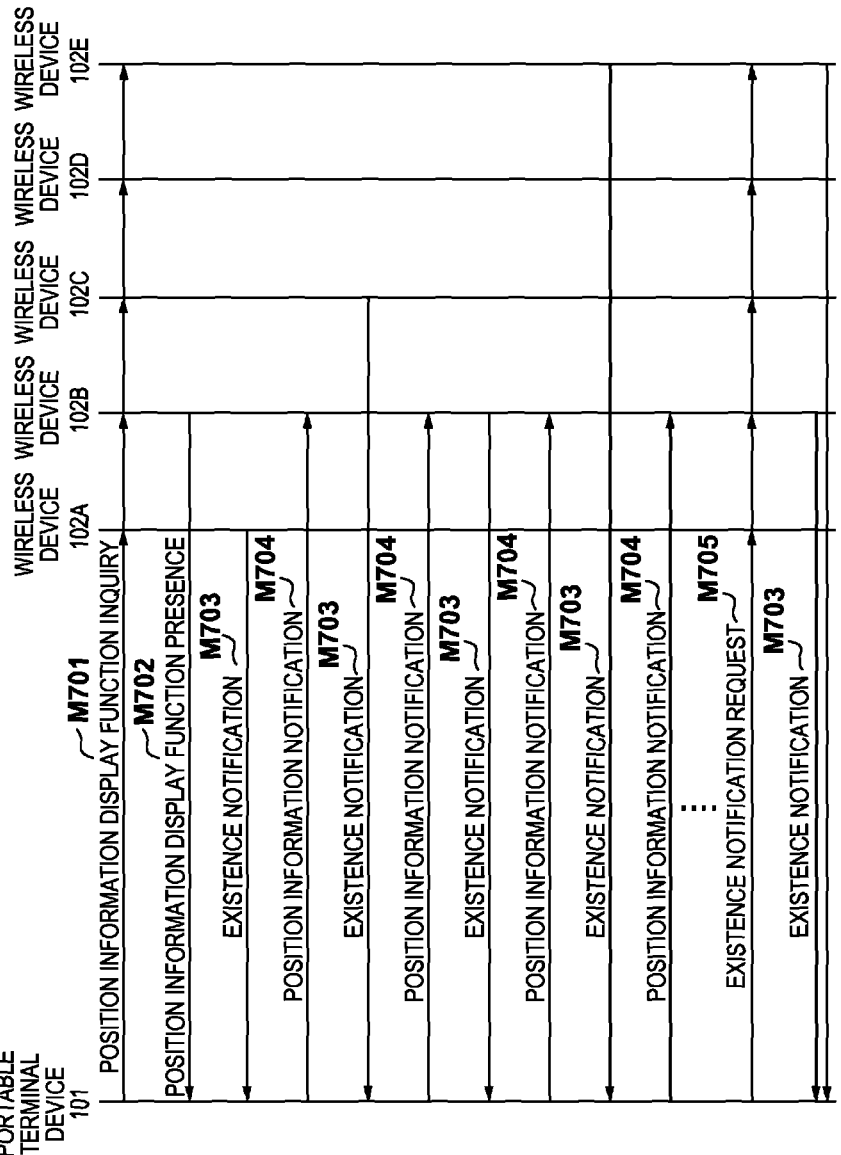
FIG. 7 is a timing chart showing communication between the portable terminal device 101 and a wireless device 102.

Processing executed by the portable terminal device 101 will be described with reference to FIG. 3 showing the flowchart of the processing. Note that FIG. 7 showing a timing chart of communication between the portable terminal device 101 and each of the wireless devices 102A to 102E is referred to as needed in the following description.

In this processing, assume that the user is using the portable terminal device 101, and the wireless device 102 is the possession of the user of the portable terminal device 101 or a wireless tag attached to the possession. In this case, if the wireless device 102 has been left, lost, or stolen, the user wants to know its position.

In step S302, the portable terminal device control unit 201 determines whether the monitor start key 210 has been pressed. If, as a result of the determination, the key has been pressed, the process advances to step S303; otherwise, the process returns to step S302.

Figure 4:
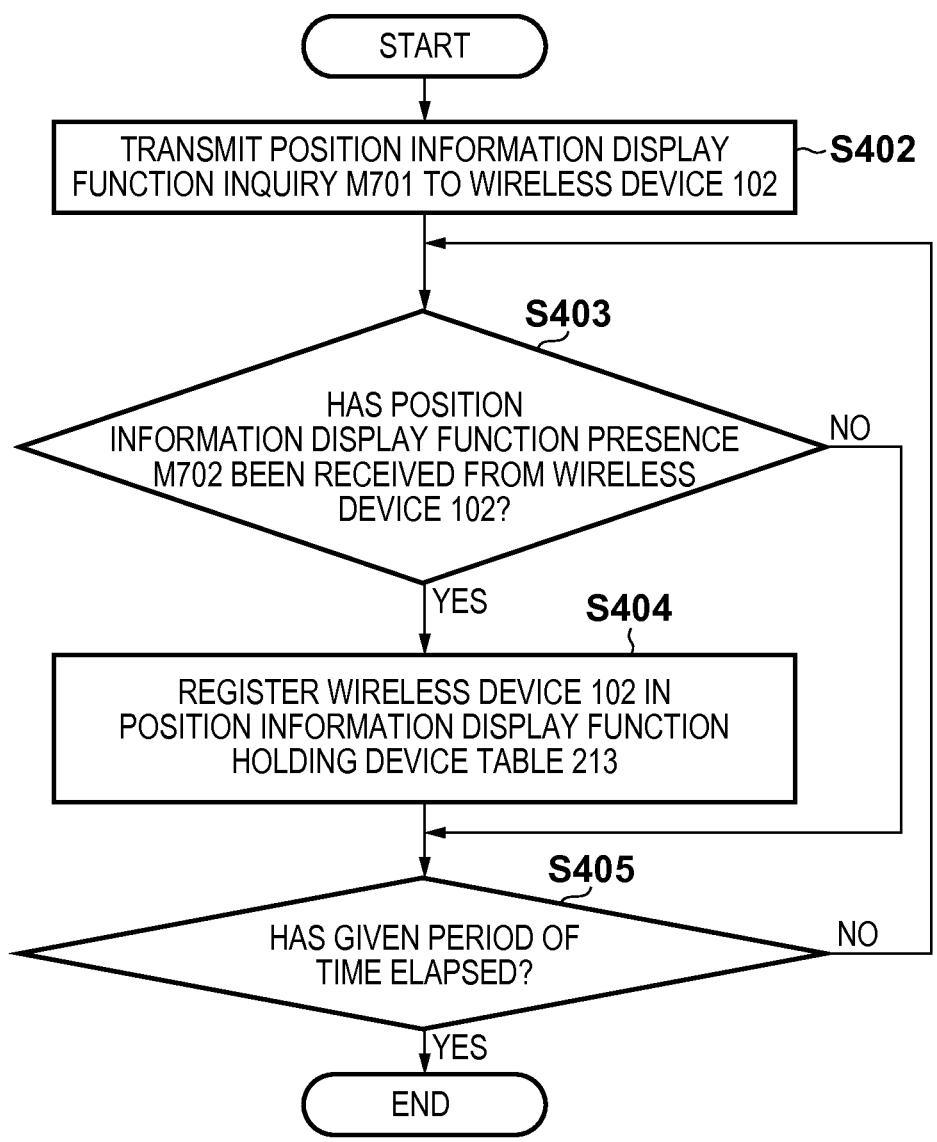
FIG. 4 is a flowchart illustrating details of processing in step S303.

In step S303, the portable terminal device 101 executes "position information display function wireless device registration processing" to be described below. The processing executed in step S303 will be explained in detail with reference to a flowchart shown in FIG. 4.

In step S402, the message transmission unit 204 transmits a position information display function inquiry message M701 to the wireless device 102 via the wireless communication control unit 202. The position information display function inquiry message M701 may be transmitted to each of the wireless devices 102A to 102E as a broadcast message or a unicast message. The position information display function inquiry message M701 need not be transmitted to a wireless device which has only a transmission function.

Upon receiving the position information display function inquiry message M701, the wireless device 102 transmits a position information display function presence message M702 to the portable terminal device 101 if it has a function of displaying its position information. On the other hand, if the wireless device 102 has no function of displaying the position information, it transmits no message to the portable terminal device 101 or transmits a position information display function absence message to the portable terminal device 101.

In step S403, the position information display function holding device determination unit 214 determines whether the position information display function presence message M702 has been received from the wireless device 102 via the wireless communication control unit 202 and message reception unit 203. If, as a result of the determination, the message has been received, the process advances to step S404; otherwise, the process advances to step S405.

In step S404, the position information display function holding device determination unit 214 registers, in the position information display function holding device table 213, information specific to the transmission source of the received position information display function presence message M702. This enables to register, in the position information display function holding device table 213, information specific to a wireless device, among the wireless devices 102A to 102E, which has a function of displaying position information. Referring to FIG. 7, since only the wireless device 102B of the wireless devices 102A to 102E transmits the position information display function presence message M702, information specific to the wireless device 102B is registered in the position information display function holding device table 213.

In step S405, the position information display function holding device determination unit 214 determines whether a given period of time has elapsed since transmission of the position information display function inquiry message M701 started in step S402. If, as a result of the determination, the given period of time has elapsed, the processing of FIG. 4 ends to advance to step S304; otherwise, the process returns to step S403.

Each of the wireless devices 102A to 102E repeatedly transmits an existence notification message M703 at regular or irregular intervals. In step S304, therefore, the position information update unit 212 determines whether an existence notification message has been received from the wireless device 102 via the wireless communication control unit 202 and message reception unit 203. If, as a result of the determination, the message has been received, the process advances to step S305; otherwise, the process returns to step S304.

Figure 5:
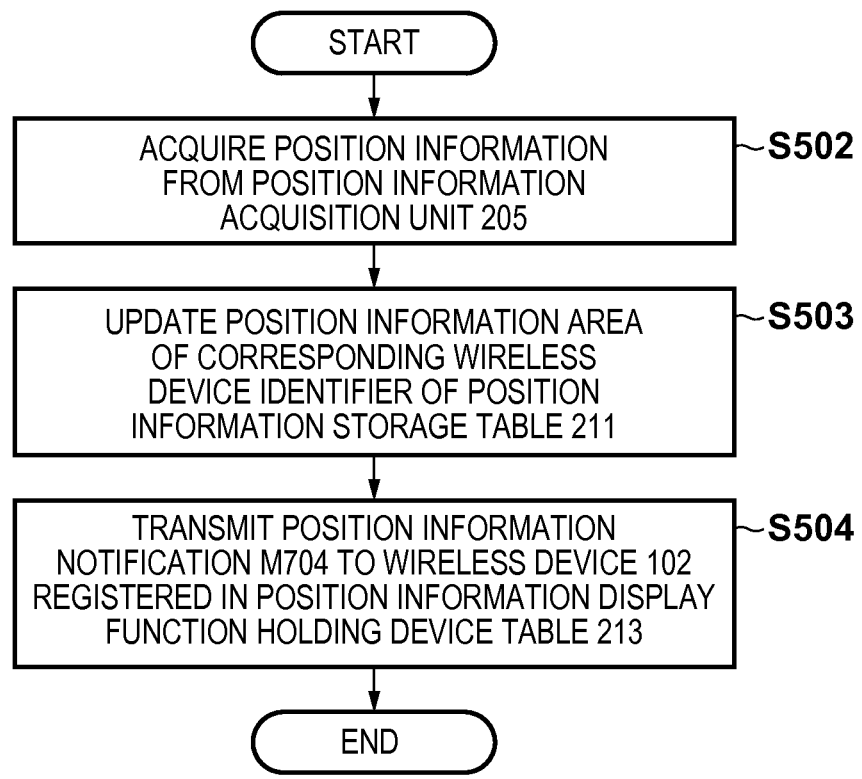
FIG. 5 is a flowchart illustrating details of processing in step S305.

In step S305, the portable terminal device 101 executes "position information storage processing" to be described below. The processing executed in step S305 will be described in detail with reference to a flowchart shown in FIG. 5.

In step S502, the position information acquisition unit 205 acquires the current position of the portable terminal device 101. That is, every time an existence notification message is received from the wireless device 102, the position information acquisition unit 205 acquires the position of the portable terminal device 101 in the reception operation. This enables to check the existence position of the wireless device 102 in a pseudo manner even though the wireless device 102 has no function of acquiring its position information.

Note that the existence notification message may contain the position information of the wireless device 102, and the position information acquisition unit 205 may acquire the position of the wireless device 102 when the message is received. This enables to acquire the position of the wireless device itself.

In step S503, the position information acquisition unit 205 registers, in the position information storage table 211, information for specifying the transmission source of the received existence notification message and the position of the portable terminal device 101 when the message is received (step S502) in association with each other.

FIG. 8 shows update examples of the position information storage table 211 by the position information acquisition unit 205.

In a state 801, an existence notification message is received from each of the wireless devices 102A, 102B, 102C, and 102E. In this case, a position 1a which has been acquired by the position information acquisition unit 205 upon receiving the existence notification message from the wireless device 102A is registered in the position information storage table 211. A position 1b which has been acquired by the position information acquisition unit 205 upon receiving the existence notification message from the wireless device 102B is also registered in the position information storage table 211. Furthermore, a position 1c which has been acquired by the position information acquisition unit 205 upon receiving the existence notification message from the wireless device 102C is registered in the position information storage table 211. A position 1e which has been acquired by the position information acquisition unit 205 upon receiving the existence notification message from the wireless device 102E is registered in the position information storage table 211. That is, the position information storage table 211 in the state 801 is generated upon receiving the existence notification message from each of the wireless devices 102A, 102B, 102C, and 102E.

Upon transiting from the state 801 to a state 802, that is, upon further receiving existence notification messages from the wireless devices 102A and 102B after generating the position information storage table 211 in the state 801, the position information storage table 211 is updated as follows.

Note that a position 2a represents a position which has been acquired by the position information acquisition unit 205 upon receiving the existence notification message from the wireless device 102A, and a position 2b represents a position which has been acquired by the position information acquisition unit 205 upon receiving the existence notification message from the wireless device 102B. In this case, in the state 802, the position 1a registered for the wireless device 102A in the position information storage table 211 is updated to the position 2a, and the position 1b registered for the wireless device 102B is updated to the position 2b. Since no existence notification message has been received from the wireless device 102C or 102E at this time, it is identified that the wireless device 102C or 102E has left the wireless communication area of the portable terminal device 101. That is, it is possible to determine that the wireless device 102C or 102E does not exist at a predetermined position.

Upon transiting from the state 802 to a state 803, that is, upon further receiving existence notification messages from the wireless devices 102B and 102E after generating the position information storage table 211 in the state 802, the position information storage table 211 is updated as follows. Note that a position 3b represents a position which has been acquired by the position information acquisition unit 205 upon receiving the existence notification message from the wireless device 102B, and a position 3e represents a position which has been acquired by the position information acquisition unit 205 upon receiving the existence notification message from the wireless device 102E. In this case, in the state 803, the position 2b registered for the wireless device 102B in the position information storage table 211 is updated to the position 3b, and the position 1e registered for the wireless device 102E is updated to the position 3e. Since no existence notification message has been received from the wireless device 102A at this time, it is identified that the wireless device 102A has left the wireless communication area of the portable terminal device 101.

Upon transiting from the state 803 to a state 804, that is, upon further receiving existence notification messages from the wireless devices 102B and 102E after generating the position information storage table 211 in the state 803, the position information storage table 211 is updated similarly.

As described above, every time an existence notification message is received, the position information update unit 212 updates the position registered in the position information storage table 211 for the transmission source of the existence notification message to a position which has been acquired by the position information acquisition unit 205 upon receiving the message.

In step S504, the position information storage information transmission unit 216 transmits a position information notification message M704 to a wireless device specified by the "information specific to the wireless device having a function of displaying position information" registered in the position information display function holding device table 213. Referring to FIG. 7, since the information specific to the wireless device 102B is registered in the position information display function holding device table 213, the position information notification message M704 is transmitted to only the wireless device 102B. The position information notification message M704 transmitted in step S504 contains contents of the position information storage table 211 in the transmission operation.

In step S306, the portable terminal device control unit 201 determines whether the device search key 208 has been pressed. If, as a result of the determination, the key has been pressed, the process advances to step S307; otherwise, the process returns to step S304.

That is, upon detecting a search instruction input by a user operation, processing in step S307 starts. A user operation for starting the processing in step S307 is not limited to press of the device search key 208, and various operations may be possible.

Figure 6:
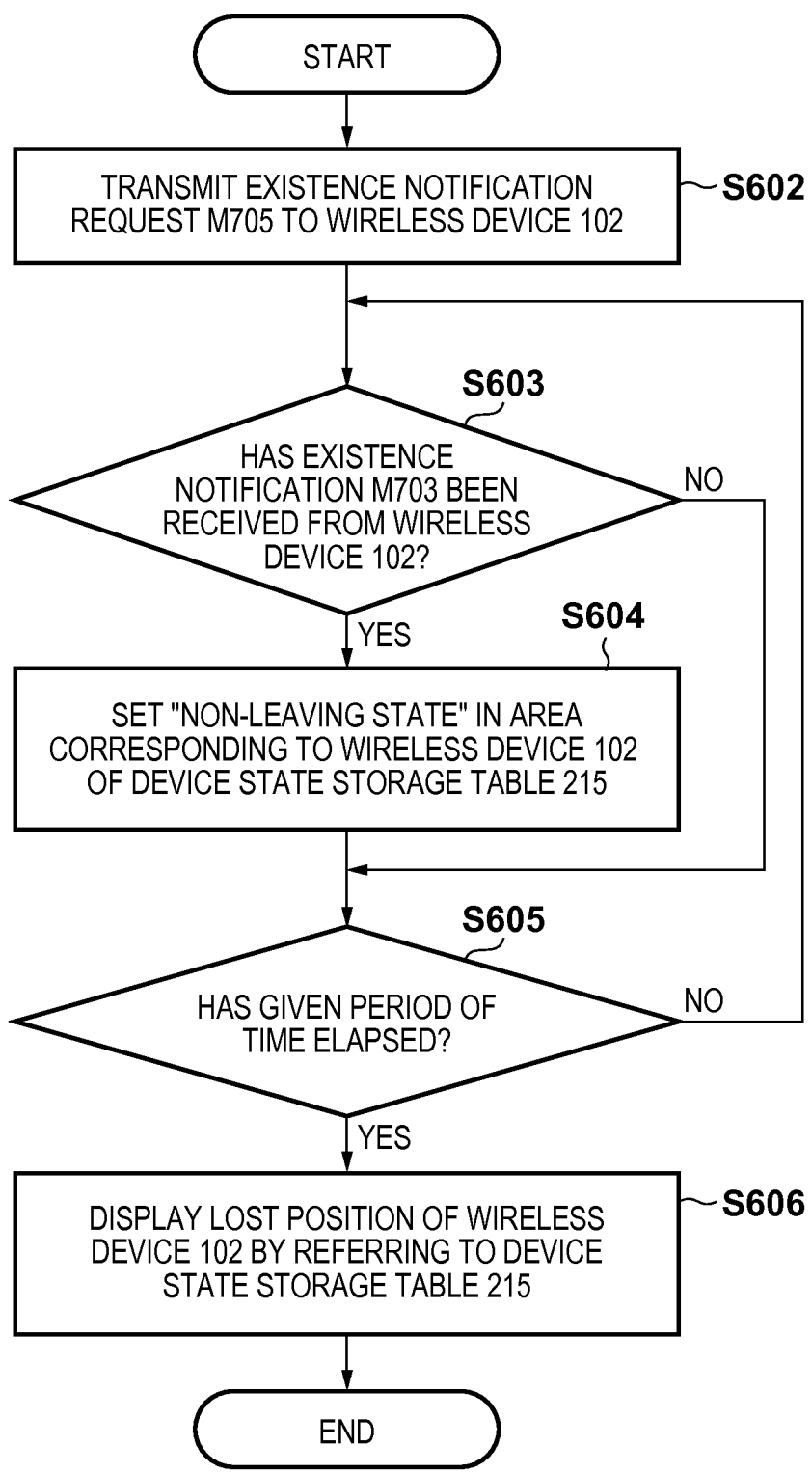
FIG. 6 is a flowchart illustrating details of processing in step S307.

In step S307, the portable terminal device 101 executes "lost article position display processing" to be described below. The processing executed in step S307 will be explained in detail with reference to a flowchart shown in FIG. 6.

In step S602, the message transmission unit 204 transmits an existence notification request message M705 to the wireless device 102 via the wireless communication control unit 202. The existence notification request message M705 may be transmitted to each of the wireless devices 102A to 102E as a broadcast message or a unicast message. The existence notification request message M705 need not be transmitted to a wireless device which has only a transmission function.

Upon receiving the existence notification request message M705, the wireless device 102 transmits, as a response message to the existence notification request message M705, the existence notification message M703 to the portable terminal device 101.

In step S603, the portable terminal device control unit 201 determines whether the existence notification message M703 has been received from the wireless device 102 via the wireless communication control unit 202 and message reception unit 203. If, as a result of determination, the message has been received, the process advances to step S604; otherwise, the process advances to step S605.

In step S604, the portable terminal device control unit 201 registers, in the device state storage table 215, information specific to the transmission source of the existence notification message M703 received in step S603 and information indicating a non-leaving state in association with each other.

In step S605, the portable terminal device control unit 201 determines whether a given period of time has elapsed since transmission of the existence notification request message M705 started in step S602. If, as a result of the determination, the given period of time has elapsed, the process advances to step S606; otherwise, the process returns to step S603.

In step S606, the portable terminal device control unit 201 specifies a wireless device which has transmitted no response message to the existence notification request message M705 (a wireless device, among the wireless devices 102A to 102E, for which no information is registered in the device state storage table 215). To do this, it is only necessary to specify "information specific to a wireless device" which has not been registered in the device state storage table 215 among "the pieces of information specific to the wireless devices" registered in the position information storage table 211.

The portable terminal device control unit 201 controls a position information display control unit 207 to execute display processing as follows. That is, a screen for notifying the user of the position registered in the position information storage table 211 in association with the information specific to the wireless device which has transmitted no response message to the existence notification request message M705 is displayed on the display unit 206.

Figure 9:
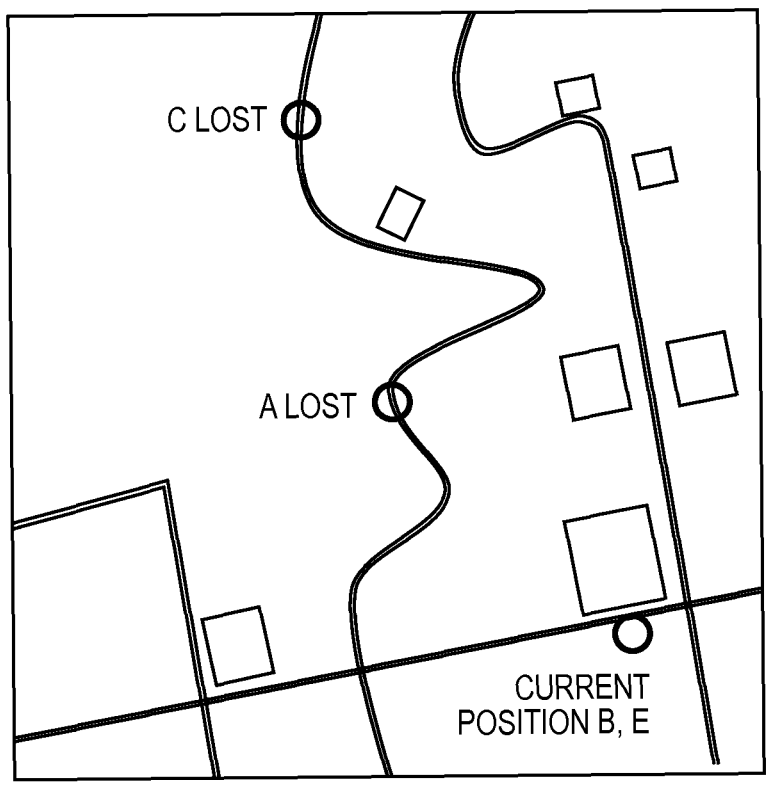
FIG. 9 is a view showing a display example of a screen.

For example, the position information display control unit 207 displays a screen shown in FIG. 9 on the display unit 206. The screen exemplified in FIG. 9 displays a map image (map information) including the positions that have been registered in the position information storage table 211 in the state 804 in association with the pieces of information specific to the wireless devices each of which has transmitted no response message to the existence notification request message M705.

At each position (or around it) on the map image, information representing a wireless device specified by the information which has been registered in the position information storage table 211 in association with the position is displayed.

Referring to FIG. 9, each of the wireless devices 102C and 102A has transmitted no response message to the existence notification request message M705. Information "C lost" indicating the wireless device 102C is displayed near the position which has been registered in the position information storage table 211 in association with the information specific to the wireless device 102C. Similarly, information "A lost" indicating the wireless device 102A is displayed near the position which has been registered in the position information storage table 211 in association with the information specific to the wireless device 102A.

Furthermore, in FIG. 9, "current position" indicates the current position of the portable terminal device 101. In FIG. 9, each of the wireless devices 102B and 102E has transmitted a response message to the existence notification request message M705. Therefore, "B" is displayed near the position which has been registered in the position information storage table 211 in association with the information specific to the wireless device 102B, and "E" is displayed near the position which has been registered in the position information storage table 211 in association with the information specific to the wireless device 102E. This indicates that the wireless devices 102B and 102E exist near the current position of the portable terminal device 101.

Using the map image, the user can identify that he/she lost the wireless device 102A after the position of "A lost", and that he/she lost the wireless device 102C after the position of "C lost".

In step S308, the portable terminal device control unit 201 determines whether the monitor end key 209 has been pressed. If, as a result of the determination, the monitor end key 209 has been pressed, the process according to the flowchart shown in FIG. 3 ends; otherwise, the process returns to step S304.

Note that the portable terminal device 101 displays the position of the lost article in the above description. Since the wireless device 102 having a function of displaying position information receives the position information notification message M704, it can display the position of the lost article, similarly to the portable terminal device 101. In the example of FIG. 7, the wireless device 102B can display a lost article, since the information specific to the wireless device 102B is registered in the position information display function holding device table 213.

As described above, according to the embodiment, since the portable terminal device 101 displays the position where the wireless device 102 was lost, the user can readily identify the position of the lost article. Since it is checked whether the wireless device 102 exists near the user when displaying the position of the lost article, and the position of the lost article is not displayed for the wireless device 102 which has been determined to be near the user, it is possible to identify which wireless device 102 has been lost.

The existence notification message M703 from the wireless device 102 may contain information indicating the remaining capacity of the battery of the wireless device 102. In this case, the portable terminal device 101 which has received such the existence notification message M703 can identify the remaining capacity of the battery of the wireless device 102. If the remaining capacity of the battery is equal to or lower than a given amount, the wireless device 102 may have a dead battery rather than being left. When displaying the position of the lost article, therefore, a message associated with the remaining capacity of the battery such as "the battery may have gone dead" may be displayed if the remaining capacity of the battery contained in the last received existence notification message M703 is equal to or lower than the given amount.

Second Embodiment

Only different points from the first embodiment will be described below. That is, assume that a system according to this embodiment is the same as that according to the first embodiment. In this embodiment, however, an arbitrary number of wireless devices may be included.

Figure 10:
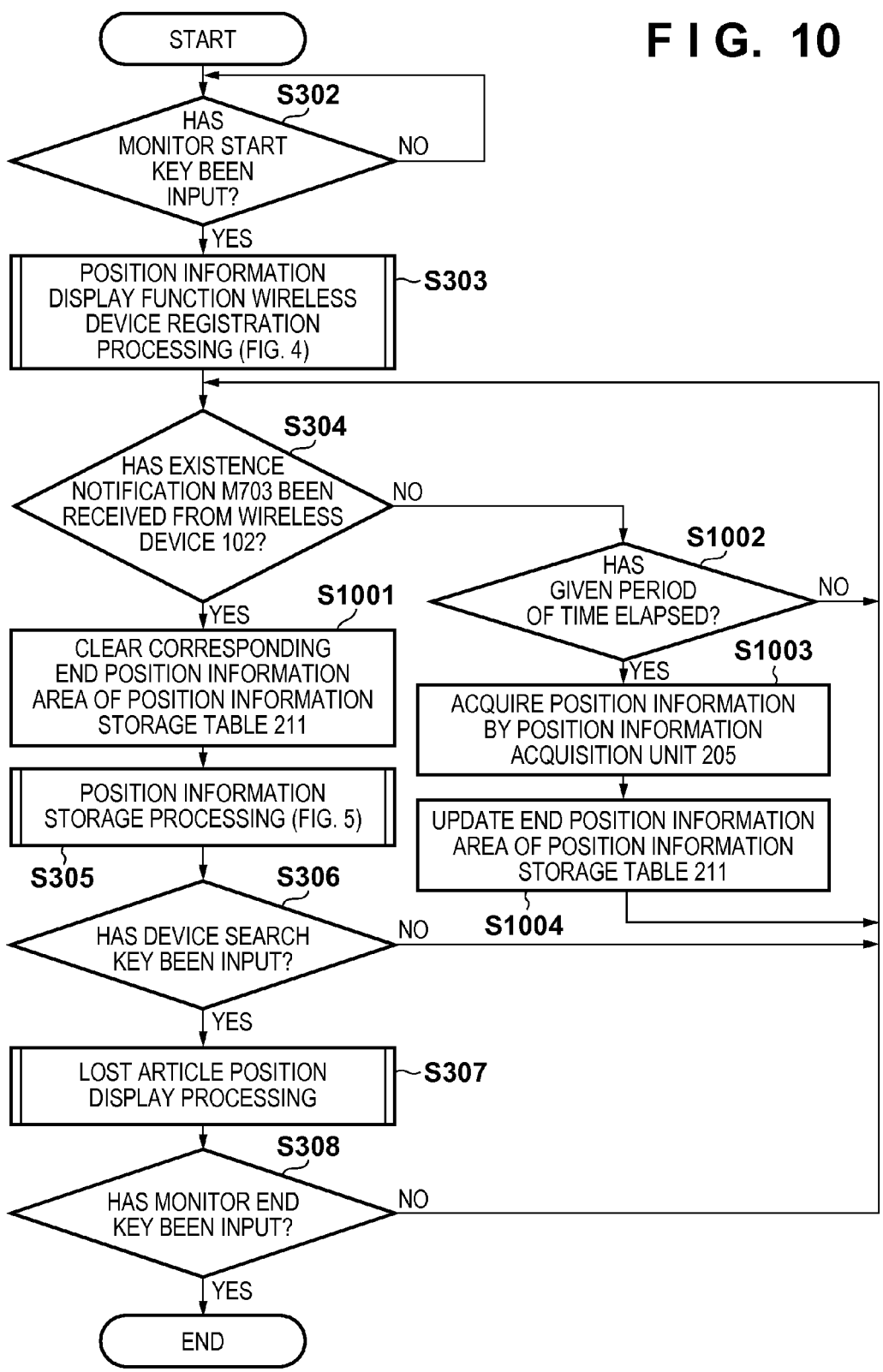
FIG. 10 is a flowchart illustrating processing executed by the portable terminal device 101.

Processing executed by a portable terminal device 101 according to the embodiment will be described first with reference to FIG. 10 showing the flowchart of the processing. Note that in FIG. 10, the same processing step as that shown in FIG. 3 has the same reference symbol, and a description thereof will be omitted.

In the embodiment, a position information storage table 211 can store the end position of each of wireless devices 102A to 102E. The end position will be described below.

In step S304, a position information update unit 212 determines whether an existence notification message has been received from a wireless device 102 via a wireless communication control unit 202 and a message reception unit 203, similarly to the first embodiment. If, as a result of the determination, the message has been received, the process advances to step S1001; otherwise, the process advances to step S1002.

In step S1001, the position information update unit 212 initializes (clears) an area (end position area) for storing the end position of each of the wireless devices 102A to 102E in the position information storage table 211. After that, processing in step S305 is executed.

On the other hand, in step S1002, a portable terminal device control unit 201 determines whether there is a wireless device, among the wireless devices 102A to 102E, for which a predetermined period of time has elapsed since it last received an existence notification message M703. If, as a result of the determination, there is a wireless device, the process advances to step S1003; otherwise, the process returns to step S304.

In step S1003, a position information acquisition unit 205 acquires the current position of the portable terminal device 101. In step S1004, the position information acquisition unit 205 registers, in the end position area, the acquired position as an end position in association with information specific to the wireless device for which the predetermined period of time has elapsed since it last received the existence notification message M703.

That is, if a wireless device, of the plurality of wireless devices, for which the predetermined period of time has elapsed since it last received the existence notification message is detected, information for specifying the detected wireless device and the position of the portable terminal device in the detection operation are registered in the memory in association with each other.

Figure 11:
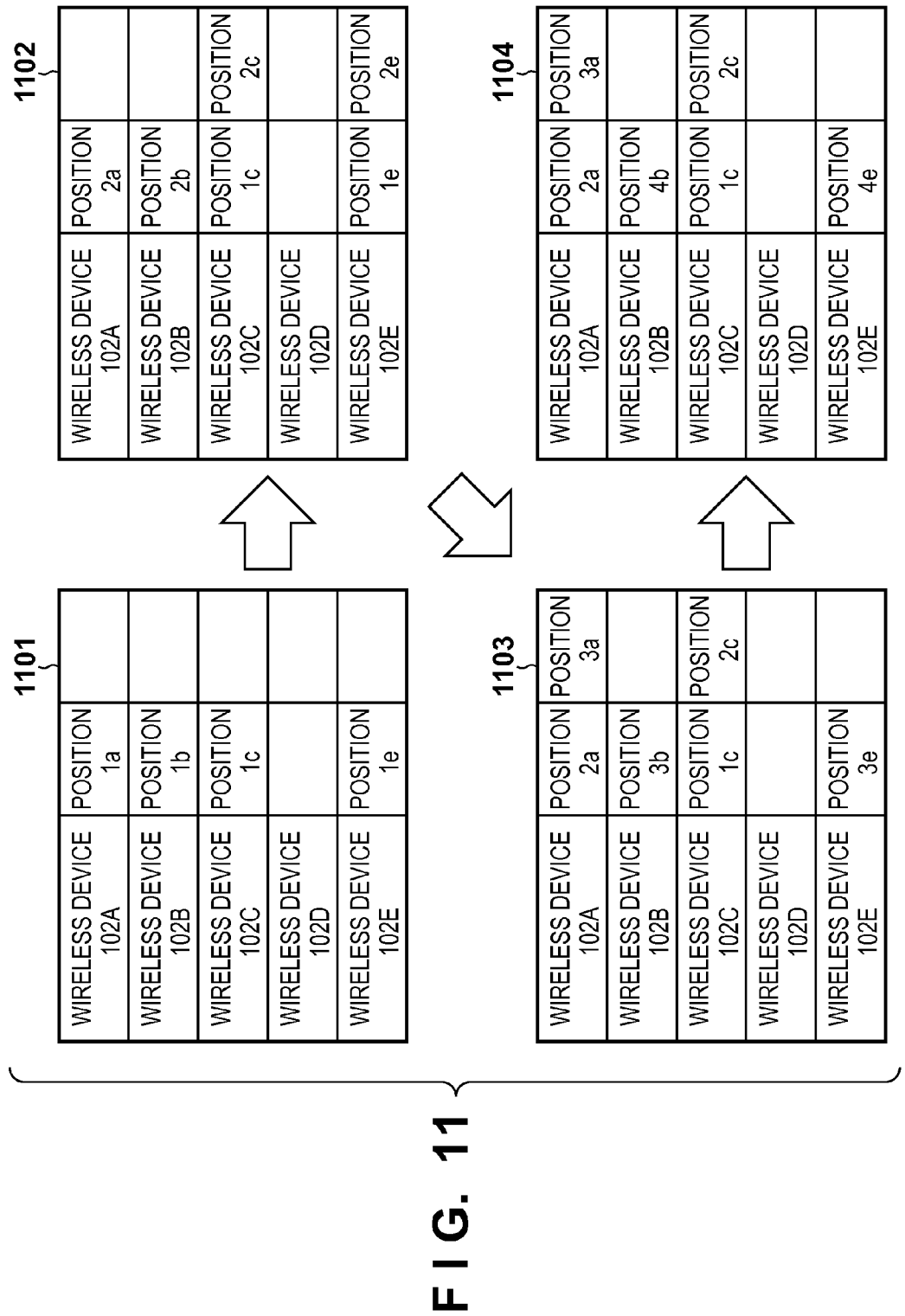
FIG. 11 is a view showing update examples of a position information storage table 211.

FIG. 11 shows update examples of the position information storage table 211 according to the embodiment. Although the left two columns of the position information storage table 211 of FIG. 11 are the same as those in the first embodiment, the rightmost column indicates the above-described end position area.

In a state 1101, since an existence notification message has been received from each of the wireless devices 102A, 102B, 102C, and 102E, the left two columns of the position information storage table 211 are the same as those of the position information storage table 211 in the above-described state 801. At this time, all the end position areas of the wireless devices 102A to 102E have been cleared.

A case in which the state transits from the state 1101 to a state 1102 will be described. In the state 1102, an existence notification message has been received again from each of the wireless devices 102A and 102B within the predetermined period of time after last receiving the existence notification message. No existence notification message, however, is received again from the wireless device 102C or 102E within the predetermined period of time after last receiving the existence notification message. In this case, the left two columns of the position information storage table 211 are the same as those of the position information storage table 211 in the above-described state 802. For the rightmost column, a position 2c of the portable terminal device 101 when the wireless device 102C was detected has been registered in the end position area corresponding to the wireless device 102C. Similarly, a position 2e of the portable terminal device 101 when the wireless device 102E was detected has been registered in the end position area corresponding to the wireless device 102E.

Referring to the table, it is identified that the wireless device 102C has left the wireless communication area of the portable terminal device 101 between a position 1c and the position 2c, and the wireless device 102E has left the wireless communication area of the portable terminal device 101 between a position 1e and the position 2e.

A case in which the state transits from the state 1102 to a state 1103 will be described. In the state 1103, an existence notification message has been received again from each of the wireless devices 102B and 102E within the predetermined period of time after last receiving the existence notification message. No existence notification message has been received again from the wireless device 102A within the predetermined period of time after last receiving the existence notification message. The predetermined period of time has not elapsed after last receiving the existence notification message from the wireless device 102C. In this case, the left two columns of the position information storage table 211 are the same as those of the position information storage table 211 in the above-described state 803. For the rightmost column, however, a position 3a of the portable terminal device 101 when the wireless device 102A was detected has been registered in the end position area corresponding to the wireless device 102A. Since the predetermined period of time has not elapsed after last receiving the existence notification message from the wireless device 102C, the end position area corresponding to the wireless device 102C is unchanged. Since an existence notification message has been received again from the wireless device 102E within the predetermined period of time after last receiving the notification message, the end position area corresponding to the wireless device 102E has been cleared.

It is apparent that the wireless device 102E has temporarily left by an operation intended by the user, and the wireless device 102A has left the wireless communication area of the portable terminal device 101 between a position 2a and the position 3a.

A case in which the state transits from the state 1103 to a state 1104 will be described next. In the state 1104, an existence notification message has been received again from each of the wireless devices 102B and 102E within the predetermined period of time after last receiving the existence notification message. The predetermined period of time has not elapsed after last receiving the existence notification message from each of the wireless devices 102A and 102C. In this case, the position information storage table 211 is updated, similarly to the above case.

Figure 12:
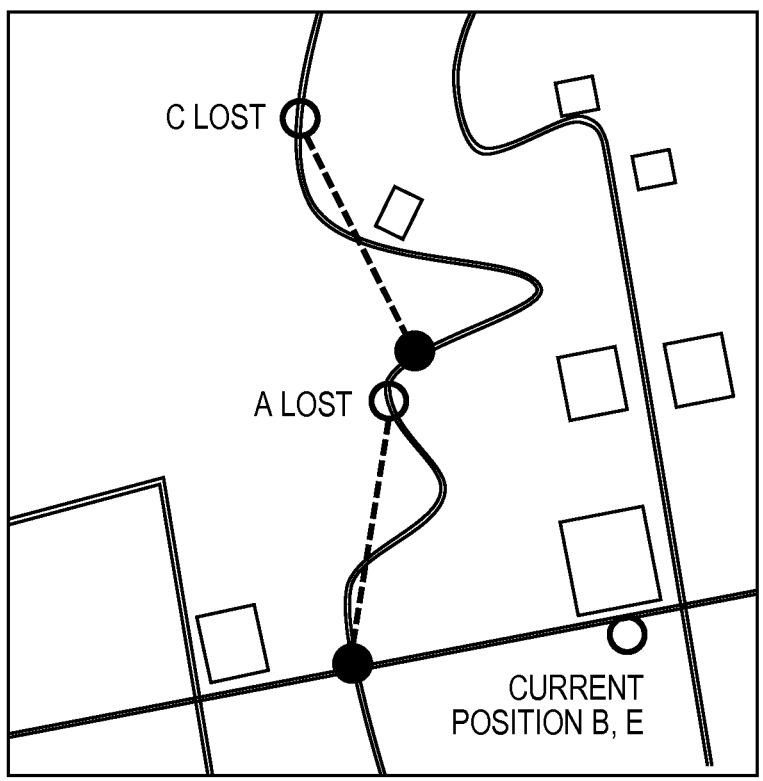
FIG. 12 is a view showing a display example of a screen.

In the embodiment, for example, the portable terminal device control unit 201 displays a screen shown in FIG. 12 on a display unit 206. The screen exemplified in FIG. 12 displays a map image including the positions that have been registered in the position information storage table 211 in the above-described state 1104 in association with the pieces of information specific to the wireless devices each of which has not transmitted a response message to an existence notification request message M705.

At each position (or around it) on the map image, information representing a wireless device specified by the information which has been registered in the position information storage table 211 in association with the position is displayed.

The wireless devices 102B and 102E are the same as those in the first embodiment. Referring to FIG. 12, the wireless device 102C or 102A has transmitted no response message to the existence notification request message M705. Therefore, the position (a filled circle) and the end position (an open circle) which have been registered in the position information storage table 211 in association with the information specific to the wireless device 102C are displayed on the map image together with "C lost". Similarly, the position (a filled circle) and the end position (an open circle) which have been registered in the position information storage table 211 in association with the information specific to the wireless device 102A are displayed on the map image together with "A lost". This allows the user to identify that he/she left (lost) the wireless device between the position indicated by the open circle and the position indicated by the filled circle.

As described above, according to the embodiment, the following effects are obtained in addition to the effects obtained in the first embodiment. In the first embodiment, although it is possible to identify that a wireless device was lost after a position displayed as a lost article position, an end position cannot be identified. In this embodiment, however, it is possible to identify the start position and end position of a range in which a wireless device was lost.

Third Embodiment

Only different points from the first embodiment will be described below. That is, assume that a system according to this embodiment is the same as that according to the first embodiment. In this embodiment, however, an arbitrary number of wireless devices may be included.

Processing executed by a portable terminal device 101 according to the embodiment will be described first with reference to FIG. 13 showing the flowchart of the processing. Note that in FIG. 13, the same processing step as that shown in FIG. 3 has the same reference symbol, and a description thereof will be omitted. FIG. 14 is a timing chart showing communication between the portable terminal device 101 and each of wireless devices 102A to 102E according to the flowchart of FIG. 13.

To monitor the wireless device 102, the portable terminal device 101 according to the embodiment transmits an existence notification request message M705 when a polling cycle has come. In step S1301, therefore, a portable terminal device control unit 201 determines whether the polling cycle has come. If, as a result of the determination, the polling cycle has come, the process advances to step S1302; otherwise, the process advances to step S304.

In step S1302, a message transmission unit 204 transmits the existence notification request message M705 to the wireless device 102 via a wireless communication control unit 202, similarly to the first embodiment.

Upon receiving the existence notification request message M705, the wireless device 102 transmits, as a response message to the existence notification request message M705, an existence notification message M703 to the portable terminal device 101, similarly to the first embodiment.

In the embodiment, the portable terminal device 101 can control a timing of transmitting the existence notification message M703 by the wireless device 102. For example, it is possible to prolong the battery life of each of the portable terminal device 101 and wireless device 102 by lengthening the transmission interval of the existence notification message M703. Since the existence notification message M703 is received immediately after transmitting the existence notification request message M705, it is possible to save the battery by intermittently receiving the message by the portable terminal device 101.

Furthermore, since it can be determined, by referring to a position acquired by a position information acquisition unit 205, whether the portable terminal device 101 is moving, it is possible to control to transmit the existence notification request message M705 while the portable terminal device 101 is moving and not to transmit it while the portable terminal device 101 stays still. This enables to avoid transmission of an unnecessary message.

Since, in general, a transmission radio wave from the wireless device 102 which has been left is gradually weakened, this may be used. That is, if the radio field intensity of the existence notification message M703 from the wireless device 102 is monitored, and is weakened, the transmission cycle of the existence notification request message M705 to the wireless device 102 is shortened. This enables to acquire the fine position of the wireless device 102 which has been left, thereby allowing display of the range of a lost article position, which has been made narrower.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-270617, filed Dec. 9, 2011, which is hereby incorporated by reference herein in its entirety.

What is claimed is:

1. A communication apparatus comprising:
a reception unit which receives a predetermined signal from another communication apparatus;
a storage unit which stores a current position of said communication apparatus and apparatus information specific to the other communication apparatus in association with each other in response to receiving the predetermined signal from the other communication apparatus; and
a display unit which displays, for each of plural pieces of apparatus information stored in the storage unit, (i) an indication at a map position, on a map displayed on a display screen, corresponding to the position of said communication apparatus stored in the storage unit in association with the stored apparatus information and (ii) the stored apparatus information of the other communication apparatus, according to a user operation for said communication apparatus,
wherein if a first position of the communication apparatus stored in the storage unit in association with the apparatus information of a first other communication apparatus is different from a second position of the communication apparatus stored in the storage unit in association with the apparatus information of a second other communication apparatus, the map position corresponding to the first position is different from the map position corresponding to the second position.

2. The apparatus according to claim 1, wherein
the indication is displayed at the map position corresponding to the position of the communication apparatus stored in the storage unit in association with the apparatus information of the other communication apparatus which has been determined not to exist at a predetermined position.

3. The apparatus according claim 1, wherein the predetermined signal contains information indicating a remaining capacity of a battery of the other communication apparatus, and if the remaining capacity of the battery of the other communication apparatus contained in the predetermined signal received from the other communication apparatus is lower than a predetermined amount, said display unit displays a message about the remaining capacity of the battery of the other communication apparatus.

4. The apparatus according to claim 1, further comprising
a request unit which repeatedly requests the other communication apparatus to transmit the predetermined signal,
wherein said reception unit receives the predetermined signal which is repeatedly transmitted from the other communication apparatus in response to the request.

5. A control method for a communication apparatus, comprising:
a reception step of receiving a predetermined signal from another communication apparatus;
a storage step of storing, in a memory, a current position of the communication apparatus and apparatus information specific to the other communication apparatus in association with each other, in response to receiving the predetermined signal from the other communication apparatus; and
a display step of displaying, for each of plural pieces of apparatus information stored in the storage step, (i) an indication at a map position, on a map displayed on a display screen, corresponding to the position of said communication apparatus stored in the storage step in association with the stored apparatus information and (ii) the stored apparatus information of the other communication apparatus, according to a user operation for the communication apparatus, wherein if a first position of the communication apparatus stored in the storage step in association with the apparatus information of a first other communication apparatus is different from a second position of the communication apparatus stored in the storage step in association with the apparatus information of a second other communication apparatus, the map position corresponding to the first position is different from the map position corresponding to the second position.

6. A non-transitory computer-readable storage medium storing a computer program for causing a computer to execute
  a reception step of receiving a predetermined signal from another communication apparatus,
  a storage step of storing, in a memory, a current position of the communication apparatus and apparatus information specific to the other communication apparatus in association with each other in response to the reception of the predetermined signal from the other communication apparatus, and
  a display step of displaying, for each of plural pieces of apparatus information stored in the storage step, (i) an indication at a map position, on a map displayed on a display screen, corresponding to the position of said communication apparatus stored in the storage step in association with the stored apparatus information and (ii) the stored apparatus information of the other communication apparatus, according to a user operation for the communication apparatus, wherein if a first position of the communication apparatus stored in the storage step in association with the apparatus information of a first other communication apparatus is different from a second position of the communication apparatus stored in the storage step in association with the apparatus information of a second other communication apparatus, the map position corresponding to the first position is different from the map position corresponding to the second position.

7. The apparatus according to claim 1, wherein as long as said reception unit does not receive the predetermined signal, said storage unit maintains last stored apparatus information of the other communication apparatus and last stored position of the communication apparatus,
  if said reception unit has not received the predetermined signal within a predetermined period of time, said display unit displays (a) a first indication at the map position, on the map, corresponding to newly acquired current position of said communication apparatus, (b) a second indication at the map position, on the map, corresponding to the last stored position of said communication apparatus, and (c) the last stored apparatus information.

* * * * *